United States Patent [19]
Yoon et al.

[11] Patent Number: 6,127,295
[45] Date of Patent: Oct. 3, 2000

[54] SILICA GLASS COMPOSITION AND METHOD FOR MANUFACTURING SILICA GLASS USING THE SAME

[75] Inventors: Young-sik Yoon; Young-min Baik, both of Gumi, Rep. of Korea

[73] Assignee: Samsung Electronics Co., Ltd., Suwon, Rep. of Korea

[21] Appl. No.: 09/165,357

[22] Filed: Oct. 2, 1998

[30] Foreign Application Priority Data

Oct. 2, 1997 [KR] Rep. of Korea ............... 97-50968

[51] Int. Cl.[7] ............... C03C 3/04; C03B 8/02
[52] U.S. Cl. ............... 501/12; 501/29; 501/37; 65/17.2; 65/395
[58] Field of Search ............... 501/12, 29, 37; 65/17.2, 395

[56] References Cited

U.S. PATENT DOCUMENTS

| | | | |
|---|---|---|---|
| 4,681,615 | 7/1987 | Toki et al. | 65/18.1 |
| 5,063,179 | 11/1991 | Menashi et al. | 501/12 |
| 5,912,397 | 6/1999 | Baik et al. | 65/17.2 |
| 5,938,805 | 8/1999 | Baik et al. | 65/17.2 |

FOREIGN PATENT DOCUMENTS 800 748   9/1958   United Kingdom .

*Primary Examiner*—Karl Group
*Attorney, Agent, or Firm*—Robert E. Bushnell, Esq.

[57] ABSTRACT

A silica glass composition and a method for manufacturing silica glass using the silica glass composition are provided. The silica glass composition includes: pyrogenetic silica having an average particle diameter of $5\times10^{-3}$ to $1\times10^{-1}$ $\mu$m and a specific surface area of 50 to 400 $m^2/g$; and heat-treated silica, as an agglomerate of the pyrogenetic silica, having an average diameter of 2 to 15 $\mu$m and a specific surface area less than that of the pyrogenetic silica. A high purity silica glass tube, in which cracking after drying rarely occurs and the shrinking ratio is remarkably decreased, can be obtained by using the silica glass composition according to the present invention. Also, a large silica glass tube can be manufactured by using the composition.

19 Claims, No Drawings

SILICA GLASS COMPOSITION AND METHOD FOR MANUFACTURING SILICA GLASS USING THE SAME

CLAIM OF PRIORITY

This application makes reference to, incorporates the same herein, and claims all benefits accruing under 35 U.S.C. §119 from an application for *SILICA GLASS COMPOSITION AND METHOD FOR MANUFACTURING SILICA GLASS USING THE SAME* earlier filed in the Korean Industrial Property Office on the 2$^{nd}$ of October 1997 and there duly assigned Serial No. 50968/1997.

BACKGROUND OF THE INVENTION

1. Technical Field

The present invention relates to a silica glass composition and to a method for preparing silica glass by a sol-gel process using the silica glass composition.

2. Related Art

Generally, silica glass is transparent, is chemically inactive, has excellent characteristics (such as thermal stability or strength) and has a low thermal expansion coefficient. Such characteristics allow silica glass to be effective and useful for optical devices, such as optical fiber or optical lenses.

An optical fiber basically comprises of a core and a cladding having a refractive index different from that of the core so that total reflection of light occurs at the core. In connection with the total reflection of light, the refractive index of the cladding is about 1% lower than that of the core. A core having a refractive index of 1.47 and a cladding having a refractive index of 1.46 are generally used.

To manufacture an optical fiber, an optical fiber preform comprised of a core rod and an overcladding tube surrounding the core rod is first fabricated. Then, the optical fiber preform is heat-treated and elongated to form the optical fiber.

A method for manufacturing an overcladding tube formed of silica glass using a sol-gel process will now be briefly described.

First, silica particles are mixed with deionized water and a dispersant. Then, a binder and a plasticizer are added to the mixture and are mixed sufficiently to form a sol.

The sol is subjected to an aging-treatment for a predetermined time. Air bubbles are removed from the aging-treated sol. A gelling agent is added thereto, and the resultant mixture is then poured into a mold.

When gelation is completed, the resultant gel is removed from the mold and is then dried.

Thereafter, the dried gel is heat-treated to remove organic substances in the gel. Subsequently, dehydroxylation and sintering processes are performed on the resulting gel, thereby obtaining an overcladding tube formed of silica glass.

Fumed silica is used as the silica particles. The fumed silica is pyrogenetic silica produced by pyrolyzing a silicon compound (e.g., $SiCl_4$), and has a specific surface area of 50–400 m$^2$/g and an average particle diameter of $5 \times 10^{-2}$ $\mu$m.

However, in the case of manufacturing silica glass using the fumed silica as the silica particle, the following problem may be generated.

Since the fumed silica is a microparticle having a small pore, it is difficult to disperse a large amount of fumed silica into the sol. Also, much time is required to remove air bubbles from the sol, and the viscosity of the sol increases excessively. Due to such characteristics of fumed silica, it is difficult to increase the content of silica solid in the sol to 50% or higher. Thus, the green density of the resultant, obtained by removing the organic substance in the gel, is limited to about 34% based on the density of the sintered body, which increases the shrinking ratio of the overcladding tube before and after the sintering process. Thus, it is practically difficult to manufacture a large silica glass tube. Also, a crack may occur in the overcladding tube after it is dried.

SUMMARY OF THE INVENTION

To solve the above problems, it is an objective of the present invention to provide a composition for preparing high-density silica glass having a reduced shrinking ratio without cracks.

It is another objective of the present invention to provide a method for preparing silica glass using the composition.

Accordingly, to achieve the first objective, there is provided a silica glass composition comprising:

pyrogenetic silica having an average particle diameter of $5 \times 10^{-3}$ to $1 \times 10^{-1}$ $\mu$m and a specific surface area of 50 to 400 m$^2$/g; and heat-treated silica, as an agglomerate of the pyrogenetic silica, having an average diameter of 2 to 15 $\mu$m and a specific surface area less than that of the pyrogenetic silica.

To achieve the second objective, there is provided a method for preparing silica glass comprising the steps of:

(a) forming a sol by mixing a dispersion medium with a mixture of pyrogenetic silica and heat-treated silica as an agglomerate of the pyrogenetic silica, the pyrogenetic silica having an average particle diameter of $5 \times 10^{-3}$ to $1 \times 10^{-1}$ $\mu$m and a specific surface area of 50 to 400 m$^2$/g, and the heat-treated silica having an average diameter of 2 to 15 $\mu$m and a specific surface area less than that of the pyrogenetic silica;

(b) aging the sol;

(c) removing air bubbles from the aging-treated sol and gelling the same to form a gel; and (d) drying the gel and then heat-treating the dried gel.

In the step (b), aging of the sol is preferably achieved at temperature in the range of 15 to 50° C. If the temperature is above 50° C., silica glass is easily broken, and if the temperature is below 15° C., aging reaction of the sol is too slow.

In step (a), the heat-treated silica is manufactured by the steps of:

(a-1) adding deionized water to the pyrogenetic silica and then mixing the resultant;

(b-1) drying the resultant obtained in step (a-1) and selecting particles having a predetermined particle diameter; and (c-1) heat-treating the resultant obtained in step (b-1) at a temperature in the range of 500 to 1100° C.

In step (a-1), the mixing ratio by weight of the pyrogenetic silica to the deionized water is 1:20 to 1:1 and, more preferably, 1:2 to 1:3. If the ratio of the deionized water to the pyrogenetic silica is greater than the above-described range, much time is required for the resultant obtained in step (a-1). Conversely, if the ratio of the deionized water to the pyrogenetic silica is less than the above-described range, dispensability of the pyrogenetic silica is bad.

In step (b-1), the average particle diameter of the particles is in the range of 10 to 850 µm.

In the present invention, a mixture of general pyrogenetic silica and heat-treated silica is used as a silica for silica glass. The mixing ratio by weight of the pyrogenetic silica and heat-treated silica is preferably 1:20 to 1:1. If the content of the deionized water to the pyrogenetic silica is greater than the above-described range, cracking after drying occurs in the silica glass. Conversely, if the content of the deionized water to the pyrogenetic silica is less than the above-described range, the shrinking ratio is too high.

The heat-treated silica is an agglomerate of the pyrogenetic silica and has a larger particle diameter, (i.e., 2~15 µm), a larger porosity and a smaller specific surface area than the pyrogenetic silica. Due to such characteristics of pyrogenetic silica, it is easy to disperse the pyrogenetic silica into the sol, which increases the content of silica solid. The viscosity of the sol can be controlled appropriately. Also, air bubbles are easy to remove from the sol, so that cracks scarcely occur after the drying process and the shrinking ratio after the sintering process is reduced.

The silica glass composition according to the present invention includes a mixture of pyrogenetic silica and heat-treated silica. The composition also includes a dispersant, a plasticizer, a binder, a gelling agent and solvents, as in the ordinary silica glass composition.

The dispersant, the plasticizer, the binder, the gelling agent and the solvents are not specifically restricted but materials generally used in manufacturing the silica glass may be used. Also, the content levels of the respective materials are the usual ones.

As the dispersant, a quaternary ammonium hydroxide compound (such as tetramethylammonium hydroxide or tetraethylammonium) is used. These materials are helpful in homogeneously dispersing the silica into the composition, and in stabilizing the silica-dispersed sol electrostatically.

As the plasticizer, polyhydric alcohol, (for example, glycerin, ethylene glycol, or 2-methylpropane-1,2,3-triol) is used.

As the binder, polyethyloxazoline, polymethyl oxazoline or polyacrylamide is used.

The gelling agent is an aqueous aliphatic ester of an acid selected from the group consisting of formic acid, lactic acid and glycolic acid.

A method for preparing heat-treated silica according to the present invention, and a method for manufacturing an overcladding tube using the heat-treated silica prepared by this method, will now be described in detail.

First, pyrogenetic silica is homogeneously mixed with deionized water and then dried to obtain a silica dry powder monolith. The monolith is sieved to select only particles having a predetermined particle diameter. The particle diameter is preferably 10 to 850 µm.

Thereafter, the resultant is heat-treated at a predetermined temperature to prepare noncrystalline silica powder having a diameter of 2 to 15 µm.

The temperature for heat treatment is preferably 500 to 1100° C., and more preferably 600 to 1000° C. If the heat-treatment temperature is below 500° C., the agglomerate of the pyrogenetic silica cannot be formed. If the heat-treatment temperature is above 1100° C., crystalline silica is produced, which is undesirable.

The mixture of the heat-treated silica prepared by this method and the pyrogenetic silica is mixed with a dispersion medium to form a sol. As the dispersion medium, deionized water is used, and a dispersant may be added if necessary.

Subsequently, a binder and a plasticizer are put into the mixture and then dispersed sufficiently for a predetermined time to prepare a sol. Then, the sol is left alone for a predetermined time for aging-treating.

Air bubbles are removed from the aging-treated sol, a gelling agent is added thereto, and then the resultant is poured into a mold. When gelation is completed, the resultant gel is removed from the mold and dried under constant temperature and humidity conditions.

Then, the dried gel is heat-treated to remove organic substances therefrom. A hydroxy group is removed from the heat-treated gel under a chlorine ($Cl_2$), oxygen ($O_2$) and helium (He) gas atmosphere, and then glassified in a sintering furnace under a helium (He) gas atmosphere.

DESCRIPTION OF THE PREFERRED EMBODIMENTS

Hereinbelow, the present invention will be described with reference to specific examples but the invention is not limited thereto.

EXAMPLE 1

A mixture of 5600 g of fumed silica having specific surface area of about 50 m$^2$/g and an average diameter of $4 \times 10^{-2}$ µm, and 14000 g of deionized water, were homogeneously mixed in a ball-mill for about 24 hours to form a sol.

The sol was dried in an oven controlled at a temperature of 120° C. for about 24 hours. Then, the resultant was passed through a sieve (#20 mesh) to select silica particles having a diameter of 850 µm or less.

The silica particles were heat-treated in a furnace controlled at a temperature of 800° C. for 3 hours. It was observed that the obtained heat-treated silica had an average diameter of 3 µm and a specific surface area of 45 m$^2$/g.

EXAMPLE 2

A mixture of 5,600 g of heat-treated silica prepared in Example 1, 1,400 g of fumed silica, 5,700 g of deionized water and 700 g of tetramethylammonium hydroxide aqueous solution (25 wt % in water) was homogeneously mixed for about 5 minutes.

Then, 21 g of polyethyloxazoine and 63 g of glycerin were put into the mixture and homogeneously mixed in a homogenizer at a rate of 8,000 rpm for about 2 minutes.

Subsequently, the mixture and 20 kg of glass ball were added to a ball-mill and mixed for about 6 hours. Next, the resultant was aging-treated in a cooling chamber controlled at a temperature of 10° C. for about 10 hours.

Air bubbles were removed from the aging-treated sol for about 20 minutes, and then 126 g of methyl formate was mixed with the sol, and the resultant was poured into a mold.

After about 30 minutes, the resultant gel was removed from the mold. The obtained gel was dried in an incubator, controlled at a temperature of 30° C. and a relative humidity of 75%, for about 70 days.

The dried gel was heated to 500° C. at a rate of 50° C. per hour, and was then maintained at that temperature for 5 hours, to remove organic substances.

The gel from which the organic substances were removed was sintered in a sintering furnace under a chlorine gas atmosphere and controlled at a temperature of about 1000° C. for about 5 hours to remove a hydroxy group. Thereafter, a sintering process was carried out in a sintering furnace, controlled at a temperature of about 1450° C. and a helium gas atmosphere, for glassification.

COMPARATIVE EXAMPLE

This embodiment was carried out in the same manner as described in Example 2, with the exception of fumed silica being used as silica.

In Example 2 and the Comparative Example, the content of silica solid in the sol, and the green density thereof after removing organic substances (based on the density of a sintered body), were measured.

As a result, it was observed that the content of the silica solid in the sol was about 46% and the green density of the gel was about 34% in the Comparative Example, and that the content of the silica solid in the sol was about 55% and the green density of the gel was about 38% in Example 2.

Also, it was observed whether there were cracks and shrinking of silica glass overcladding tubes manufactured by Example 2 and the Comparative Example.

It was found that cracks after drying scarcely occur in the overcladding tube manufactured by Example 2, in contrast to the overcladding tube manufactured by the Comparative Example. Also, the shrinking ratio of the overcladding tube manufactured by Example 2 was 24% and the shrinking ratio of the overcladding tube manufactured by the Comparative Example was 28%. Thus, the shrinking ratio of the overcladding tube manufactured by Example 2 was far lower than that of the overcladding tube manufactured by the Comparative Example.

Therefore, a high purity silica glass tube, in which cracking after drying scarcely occurs and in which the shrinking ratio is remarkably decreased, can be obtained by using a silica glass composition according to the present invention. Also, a large silica glass tube can be manufactured by using the composition.

The silica glass obtained by the manufacturing method according to the present invention can be used as silica glass for a semiconductor device, an optical lens, etc., as well as for an optical fiber preform.

What is claimed is:

1. A silica glass composition, comprising:

pyrogenetic silica having an average particle diameter in the range of $5 \times 10^{-3}$ to $1 \times 10^{-1}$ $\mu$m and a specific surface area in the range of 50 to 400 $m^2/g$; and heat-treated silica, as an agglomerate of the pyrogenetic silica, having an average diameter in the range of 2 to 15 $\mu$m and a specific surface area less than that of the pyrogenetic silica.

2. The silica glass composition according to claim 1, wherein the mixing ratio by weight of the pyrogenetic silica to the heat-treated silica is in the range of 1:20 to 1:1.

3. The silica glass composition according to claim 1, wherein said silica glass composition is used in manufacturing optical fiber.

4. A method for preparing silica glass, comprising the steps of:

(a) forming a sol by mixing a dispersion medium and a mixture of pyrogenetic silica and heat-treated silica as an agglomerate of said pyrogenetic silica, said pyrogenetic silica having an average particle diameter in the range of $5 \times 10^{-3}$ to $1 \times 10^{-1}$ $\mu$m and a specific surface area in the range of 50 to 400 $m^2/g$, said heat-treated silica having an average diameter in the range of 2 to 15 $\mu$m, and a specific surface area less than that of the pyrogenetic silica;

(b) aging the sol;

(c) removing air bubbles from the aged sol and gelling the same to form a gel; and (d) drying the gel and then heat-treating the dried gel.

5. The method according to claim 4, wherein the mixture of the pyrogenetic silica and the heat-treated silica has a ratio by weight of the pyrogenetic silica to the heat-treated silica in the range of 1:20 to 1:1.

6. The method according to claim 4, wherein the heat-treated silica is manufactured by the steps of:

(a-1) adding deionized water to the pyrogenetic silica to form a resultant and then mixing the resultant;

(b-1) drying the resultant obtained in step (a-1) and selecting particles having a predetermined particle diameter; and (c-1) heat-treating the dried resultant obtained in step (b-1) at a temperature in the range of 500 to 1100° C.

7. The method according to claim 6, wherein step (a-1) comprises adding the deionized water to the pyrogenetic silica in a mixing ratio by weight of the pyrogenetic silica to the deionized water in the range of 1:20 to 1:1.

8. The method according to claim 6, wherein the average particle diameter of the particles selected in step (b-1) is in the range of 10 to 850 $\mu$m.

9. The method according to claim 4, wherein step (b) comprises aging the sol at a temperature in the range of 15 to 50° C.

10. A method for preparing silica glass, comprising:

mixing pyrogenetic silica and heat-treated silica which is an agglomerate of the pyrogenetic silica to form a silica composition, said pyrogenetic silica having an average particle diameter in the range of $5 \times 10^{-3}$ to $1 \times 10^{-1}$ $\mu$m and a specific surface area in the range of 50 to 400 $m^2/g$, and said heat-treated silica having an average diameter in the range of 2 to 15 $\mu$m and a specific surface area less than that of the pyrogenetic silica.

11. The method of claim 10, further comprising the step of:

preparing said heat-treated silica by:

homogeneously mixing said pyrogenetic silica with deionized water and then drying to obtain a silica dry powder monolith;

sieving the monolith to select particle shaving diameters in the range of 10 to 850 $\mu$m; and heat-treating the selected particles at a temperature in the range of 500 to 1100° C.

12. The method of claim 10, further comprising the step of:

forming a sol by mixing said silica composition and a dispersion medium;

aging said sol;

removing air bubbles from the aged sol and gelling the same to form a gel; and drying the gel and then heat-treating the dried gel.

13. The method of claim 10, said step of mixing further comprising:

mixing the pyrogenetic silica and the heat treated silica in a weight ratio in the range of 1:20 to 1:1.

14. The method of claim 12, said step of forming a sol further comprising:

said dispersion medium containing water, and the silica composition and water being in a weight ratio in the range of 1:20 to 1:1.

15. The method of claim 14, said step of forming a sol further comprising:

mixing said silica composition with water in a weight ratio in the range of 1:2 to 1:3.

16. The method of claim 14, said step of forming a sol further comprising:

adding dispersant to the mixture of the silica composition and water.

17. The method of claim 14, further comprising the step of:

adding a binder and a plasticizer to the sol.

18. The method of claim 12, further comprising the step of:

exposing the dried and heat-treated gel to an atmosphere comprising chlorine, oxygen and helium, for removal of hydroxy groups.

19. The method of claim 18, further comprising the step of:

after said step of exposing the dried and heat-treated gel, glassifying the gel in a sintering furnace under a helium atmosphere.

* * * * *